(12) United States Patent
Rothman et al.

(10) Patent No.: US 7,889,685 B2
(45) Date of Patent: Feb. 15, 2011

(54) SYSTEM AND METHOD FOR PLATFORM RESILIENT VOIP PROCESSING

(75) Inventors: Michael A. Rothman, Puyallup, WA (US); Vincent J. Zimmer, Federal Way, WA (US)

(73) Assignee: Intel Corporation, Santa Clara, CA (US)

( * ) Notice: Subject to any disclaimer, the term of this patent is extended or adjusted under 35 U.S.C. 154(b) by 1089 days.

(21) Appl. No.: 11/644,407

(22) Filed: Dec. 22, 2006

(65) Prior Publication Data

US 2008/0153421 A1     Jun. 26, 2008

(51) Int. Cl.
*H04L 12/16* (2006.01)
(52) U.S. Cl. ...................... 370/264; 370/352
(58) Field of Classification Search ................ None
See application file for complete search history.

(56) References Cited

U.S. PATENT DOCUMENTS

| | | | | |
|---|---|---|---|---|
| 6,657,955 | B1 * | 12/2003 | Bonneau et al. | 370/229 |
| 6,681,282 | B1 * | 1/2004 | Golden et al. | 710/302 |
| 6,944,147 | B2 * | 9/2005 | Chheda | 370/342 |
| 7,177,324 | B1 * | 2/2007 | Choudhury et al. | 370/468 |
| 2001/0033583 | A1 * | 10/2001 | Rabenko et al. | 370/503 |
| 2001/0050918 | A1 * | 12/2001 | Surprenant et al. | 370/442 |
| 2006/0215600 | A1 * | 9/2006 | Chen et al. | 370/328 |
| 2006/0227725 | A1 * | 10/2006 | Huotari et al. | 370/254 |
| 2006/0262748 | A1 * | 11/2006 | Dahl et al. | 370/329 |
| 2007/0033260 | A1 * | 2/2007 | Grouzdev et al. | 709/213 |
| 2007/0234031 | A1 * | 10/2007 | Garney | 713/2 |
| 2007/0288938 | A1 * | 12/2007 | Zilavy et al. | 719/327 |

OTHER PUBLICATIONS

U.S. Appl. No. 11/517,195, filed Sep. 5, 2006, Michael A. Rothman; Vincent J. Zimmer.

* cited by examiner

*Primary Examiner*—Jayanti K Patel
*Assistant Examiner*—Hooman Houshmand
(74) *Attorney, Agent, or Firm*—Barnes & Thornburg, LLP; Glen M. Kellett

(57) ABSTRACT

A system and method for platform resilient VoIP (Voice over Internet Protocol) processing in a partitioned environment. The system comprises a plurality of soft partitions. At least one soft partition is a sequestered partition. The sequestered partition including one or more core processors having a controlled, real-time operating system and at least one network interface card (NIC) coupled to the one or more core processors. The NIC is dedicated to the sequestered partition, and the one or more core processors are used as an offload engine solely dedicated to Voice over Internet Protocol (VoIP) processing.

21 Claims, 5 Drawing Sheets

SYSTEM AND METHOD FOR PLATFORM RESILIENT VOIP PROCESSING

BACKGROUND OF THE INVENTION

1. Field of the Invention

The present invention is generally related to partitioning in computer systems. More particularly, the present invention is related to a system and method for platform resilient VoIP (Voice over Internet Protocol) processing in a partitioned environment.

2. Description

Problems exist today when trying to deploy VoIP as a ubiquitous feature in a consumer environment. Unlike traditional wired telephone service, the current state of the art for VoIP is highly susceptible to drop-outs (i.e., dropped calls) and significant system lags/delays in transmission streaming. Another problem associated with current day VoIP is spotty peer-to-peer handshake communication.

Many of the problems encountered by VoIP often times have to do with the platform configuration and the software environment in which VoIP operates; not in the underlying network service. Often times the problems that occur are associated with bad driver functionality, very poor real-time support with the operating system (OS), viruses, delays, bad timing algorithms that cause the network to slow down or the machine to hang for inexplicable periods of time, etc. An OS is very prone to driver instability which may lead to critical errors in overall component operations as well as time-critical streaming services. Problems may also be associated with poorly controlled environments where untested software combinations have been employed which may cause odd interactions with other components in the software stack.

If any of these problems occur when running active voice software in a backbone call server, gateway, a softphone or in terminal IP phone, etc., dropped calls and garbled data are sure to result. For example, a call server having a VoIP engine that resides within the host partition and operates from the same operating system as the host partition is susceptible to these problems. If the operating system crashes, so does the VoIP engine. If a device driver suddenly or unexpectedly turns its interrupts off and gets stuck in a loop for an excessive period of time, the system is delayed, which includes delays for VoIP messages.

Thus, what is needed is a system and method that separates the VoIP functionality from the normal operations of a computer. What is also needed is a system and method that provides a VoIP offload that operates independent of the host partition and its operating system. What is further needed is a system and method that provides a VoIP system capable of operating with the same reliability as a traditional POTS (Plain Old Telephone Service) system.

BRIEF DESCRIPTION OF THE DRAWINGS

The accompanying drawings, which are incorporated herein and form part of the specification, illustrate embodiments of the present invention and, together with the description, further serve to explain the principles of the invention and to enable a person skilled in the pertinent art(s) to make and use the invention. In the drawings, like reference numbers generally indicate identical, functionally similar, and/or structurally similar elements. The drawing in which an element first appears is indicated by the leftmost digit(s) in the corresponding reference number.

DETAILED DESCRIPTION OF THE INVENTION

While the present invention is described herein with reference to illustrative embodiments for particular applications, it should be understood that the invention is not limited thereto. Those skilled in the relevant art(s) with access to the teachings provided herein will recognize additional modifications, applications, and embodiments within the scope thereof and additional fields in which embodiments of the present invention would be of significant utility.

Reference in the specification to "one embodiment", "an embodiment" or "another embodiment" of the present invention means that a particular feature, structure or characteristic described in connection with the embodiment is included in at least one embodiment of the present invention. Thus, the appearances of the phrase "in one embodiment" or "in an embodiment" appearing in various places throughout the specification are not necessarily all referring to the same embodiment.

Embodiments of the present invention are directed to a system and method for a VoIP (Voice over Internet Protocol) service that operates according to reliability standards of a POTS (Plain Old Telephone Service) system. This is accomplished by constructing a VoIP offload that is solely dedicated to a software-based sequestered partition and is independent of any other software as its root. By offloading the VoIP operation to a dedicated sequestered partition, errors and/or failures that occur within a host partition have no effect on VoIP operations. In other words, when the host partition fails, dies, or needs to be rebooted, the VoIP offload is not affected. By introducing a capability that is traditionally a feature that depends on a complex stack of software and making it part of a platform deployment that is agnostic to the main partition software stack, a general purpose personal computer (PC) can cooperatively and reliably support VoIP and other types of special purpose capabilities.

Figure 1:
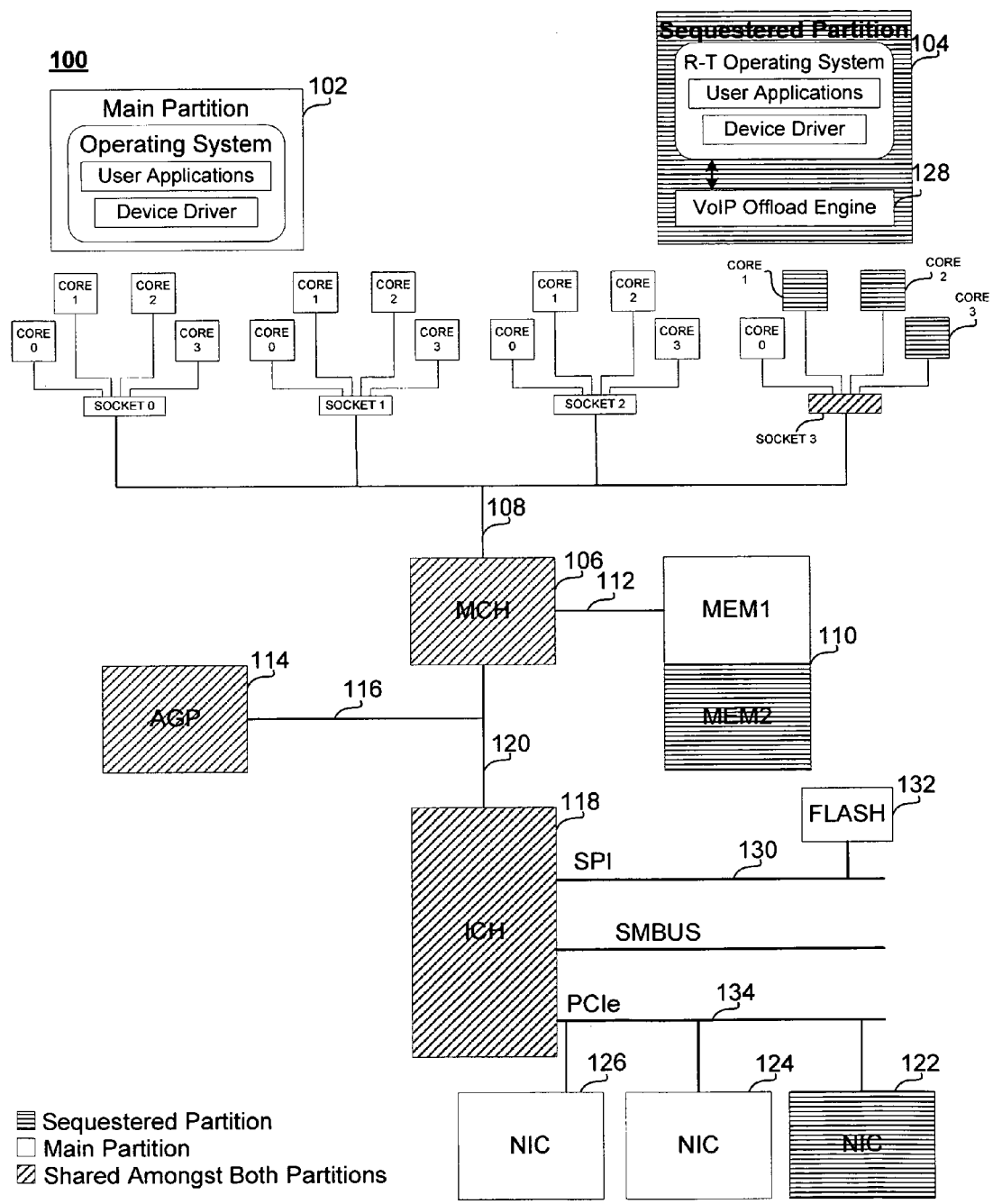
FIG. 1 is a block diagram illustrating an exemplary platform topology of a soft-configurable partitioning environment having a VoIP offload in a sequestered partition according to an embodiment of the present invention.

Embodiments of the present invention may be implemented using hardware, software, or a combination thereof and may be implemented in one or more multi-core processor platforms or other single-core processing systems. In fact, in one embodiment, the invention is directed toward one or more multi-core processor platforms capable of carrying out the functionality described herein. FIG. 1 illustrates an exemplary platform topology 100 of a soft-configurable partitioning environment having a VoIP offload in a sequestered partition according to an embodiment of the present invention. Various embodiments are described in terms of this exemplary partitioning scheme 100. After reading this description, it will be apparent to a person skilled in the relevant art(s) how to implement the invention using other partitioning schemes and/or other computer architectures. For example, embodiments of the present invention are described using two partitions for simplicity, a main host partition and a sequestered partition. One skilled in the relevant art(s) would know that an implementation of an embodiment of the present invention having more than two partitions with at least one of the partitions being a sequestered partition having a VoIP engine may be used as well.

Partitioning scheme 100 comprises a main partition 102 and a sequestered partition 104. In one embodiment, main partition 102 and sequestered partition 104 are unaware that they co-exist. In other words, main partition 102 may not be aware of sequestered partition 104 and vice versa. In another embodiment of the present invention, main partition 102 and sequestered partition 104 may know that they co-exist.

Each partition (102, 104) has a plurality of multi-core processors on at least one socket. For example, main partition 102 includes a plurality of multi-core processors (cores 0-3) on sockets 0, 1, and 2, and a single core processor (core 0) on socket 3. Main partition 102 may also allow multiple OSs (Operating Systems) as guests of main partition 102. For example, main partition 102 may allow a Windows OS and a Linux OS to run concurrently on different dedicated core processors of main partition 102 without either OS knowing that the other exists.

Note that in the present example, socket 3 receives data from main partition 102 and sequestered partition 104 while sockets 0, 1, and 2 receive data from main partition 102. Each core processor is a complete and functional processor designed into its corresponding socket.

Sequestered partition 104 includes multi-core processors (cores 1, 2, and 3) on socket 3. In embodiments of the present invention, sequestered partition 104 may have its own operating system, independent from any operating systems running on main partition 102. The operating system of sequestered partition 104 may be a very specific controlled, real-time operating system having VoIP software applications. The operating system of sequestered partition 104 may be very well validated with no external drivers. The use of a controlled, real-time operating system independent from the operating system(s) of main partition 102 provides VoIP functionality that is free from many of the problems associated with platform configurations in which a single operating system controls both main partition functionality and VoIP functionality.

In an embodiment, one or more core processors may be used to accomplish a specific functionality. For example, sequestered partition 104 having core processors 1, 2, and 3 on socket 3 may be used as an offload engine solely dedicated to VoIP functionality while main partition 102 having multi-core processors 0-3 on sockets 0, 1, and 2 and single core processor 0 on socket 3 may be dedicated to other user operations of the platform, separate and distinct from VoIP operations. In such an embodiment, sequestered partition 104 may include a VoIP offload engine 128 and an operating system solely dedicated to executing VoIP applications, thereby making it much more tolerant to the instabilities associated with main partition 102. In other embodiments, the functionality of multi-core processors on sockets 0, 1, and 2, and single core processor 0 on socket 3 of main partition 102 may be used for multiple functions, apart and distinct from the VoIP functionality of sequestered partition 104. For example, multi-core processors on sockets 0 and 1 may be dedicated to running applications resident in memory while multi-core processors on socket 2 and single-core processor 0 on socket 3 may be used for Internet/Intranet use or as another type of offload engine.

Each core processor (core 0, core 1, core 2, and core 3) on sockets 0, 1, 2, and 3 communicates with a memory controller hub (MCH) 106, also known as a North bridge, via a front side bus 108. MCH 106 communicates with system memory 110 via a memory bus 112. System memory 110 is partitioned into two parts, Mem 1 and Mem 2. Mem 1 is used to store data for main partition 102 and Mem 2 is used to store data for sequestered partition 104. MCH 106 recognizes the partitioning and will route memory requests from main partition 102 to Mem 1 and memory requests from sequestered partition 104 to Mem 2. MCH 106 may also communicate with an advanced graphics port (AGP) 114 via a graphics bus 116.

MCH 106 communicates with an I/O controller hub (ICH) 118, also known as a South bridge, via a peripheral component interconnect (PCI) bus 120. ICH 118 may be coupled to one or more I/O (Input/Output) component devices, such as, but not limited to, a plurality of network interface controllers (NICs) 122, 124, and 126 via a PCI bus 134. In an embodiment of the present invention, NICs 124 and 126 are I/O devices dedicated solely to main partition 102 and NIC 122 is an I/O device dedicated solely to sequestered partition 104.

Although other types of I/O component devices may be used, NICs 122, 124, and 126 were chosen as exemplary I/O component devices for enabling IP (Internet Protocol) network communications for both main partition 102 and sequestered partition 104, respectively. One skilled in the relevant art(s) would know that other I/O component devices capable of enabling IP (Internet Protocol) network communications may be used as well.

Core processors 0-3 may be IA64 (Itanium) processors manufactured by Intel® Corporation, located in Santa Clara, Calif., or any other type of processors capable of carrying out the methods disclosed herein. Although FIG. 1 shows four core processors on a single socket, the invention is not limited to four core processors on a single socket. In other embodiments there may be more than four core processors on a single socket or less than four core processors on a single socket. One or more of the core processors may include multiple threads as well.

As previously indicated memory 110 is partitioned into two parts, Mem 1 and Mem 2 for use by main partition 102 and sequestered partition 104, respectively. Memory 110 may be a hard disk, a floppy disk, random access memory (RAM), read only memory (ROM), flash memory, or any other type of medium readable by core processors 0-3. Memory 110 may store instructions for performing the execution of method embodiments of the present invention.

Nonvolatile memory, such as Flash memory 132, may be coupled to ICH 118 via a SPI (System Parallel Interface) bus 130. In embodiments of the present invention, BIOS firmware may reside in Flash memory 132 and at boot up of the platform, instructions stored on Flash memory 132 may be executed. In an embodiment, Flash memory 132 may also store instructions for performing the execution of method embodiments described herein.

VoIP offload engine 128 allows telephony usage over an IP (Internet Protocol) network through the digitization and packetization of voice transmissions. VoIP offload engine 128 converts analog voice signals to digital signals, which are then compressed and translated into digital packets for transmission over the Internet to a receiver. The receiver can then decompress and depacketize the data back into an analog signal for listening over a speaker, earpiece, or any other device that enables one to hear analog signals.

Figure 2:
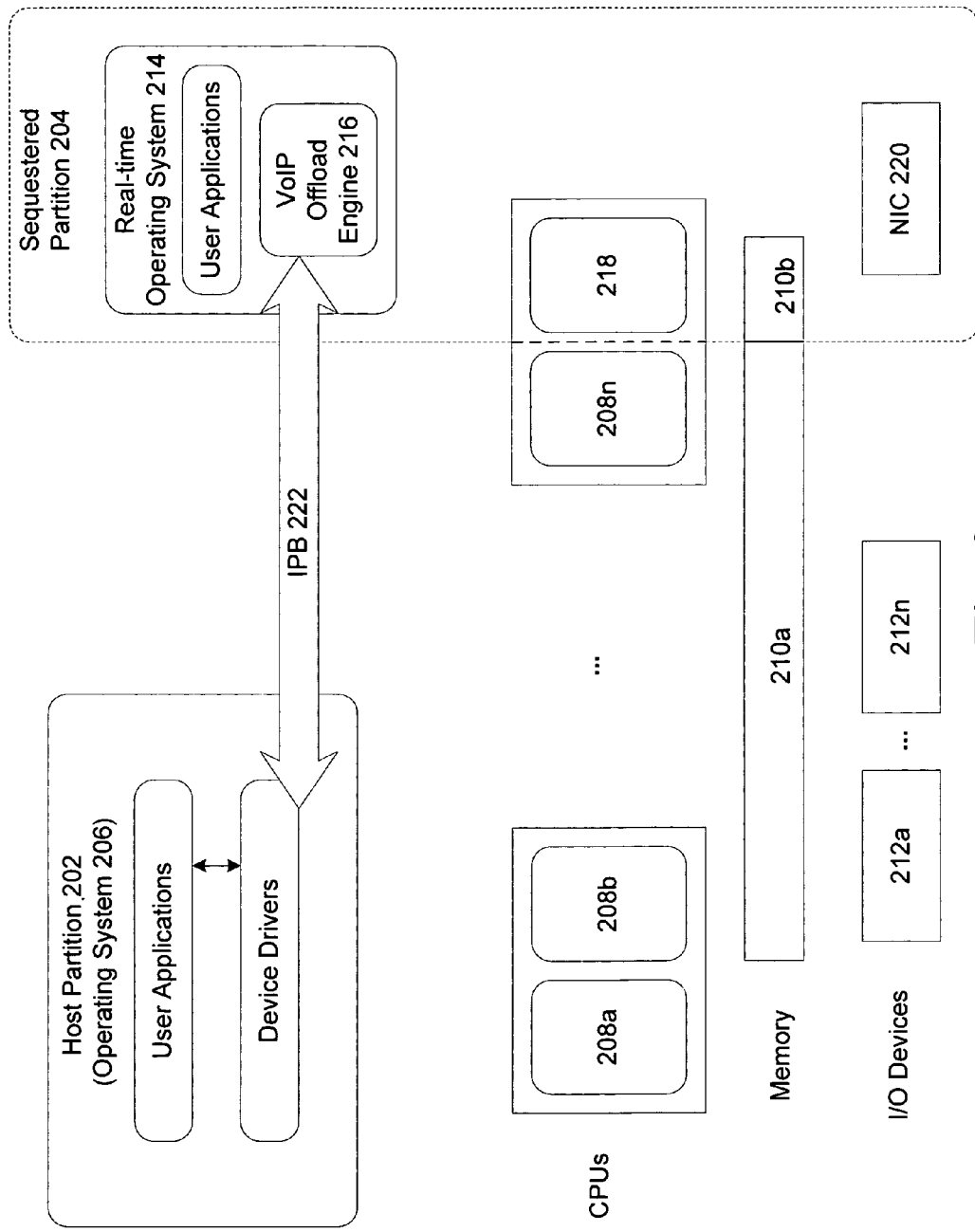
FIG. 2 is a block diagram illustrating another exemplary platform topology of a soft-configurable partitioning environment having a VoIP offload in a sequestered partition according to an embodiment of the present invention.

FIG. 2 is a block diagram illustrating another exemplary platform topology of a soft-configurable partitioning environment having a VoIP offload in a sequestered partition according to an embodiment of the present invention. Platform topology 200 comprises a host partition 202 and a sequestered partition 204. Host partition 202 comprises an operating system (OS) 206, such as, for example, Windows® XP by Microsoft Corporation, a plurality of CPUs 208a, ... 208n, a partitioned portion of memory 210a, and a plurality of I/O devices 212a, ..., 212n, such as, for example, network interface cards or NICs, a hard drive, a flash memory, a keyboard, a mouse, etc. Sequestered partition 204 comprises a real-time operating system dedicated to running VoIP applications 214, a VoIP offload engine 216, at least one CPU 218, a partitioned portion of memory 210b, and an I/O device 220, namely a NIC. Platform topology 200 shows sequestered partition 204 having one CPU for illustrative purposes only. One skilled in the relevant art(s) would know that more than one CPU may be used by sequestered partition 204 without departing from the scope of embodiments of the present invention. Although platform topology 200 illustrates a NIC as the only I/O device for sequestered partition 204, more than one NIC as well as other types of I/O devices may be used as well, such as, for example, a hard drive, flash memory, a keyboard, a mouse, etc.

With platform topology 200, main partition 202 may have reason to use VoIP functionality. Thus, with this embodiment, components, such as, for example, VoIP offload engine 216 and NIC 220 within sequestered partition 204 are not solely dedicated to sequestered partition 204, and therefore, may be utilized by main partition 202. In this instance, an Inter-Partition Bridge (IPB) 222 is used to communicate between main partition 202 and sequestered partition 204. Prior to launching VoIP offload engine 216, Inter-Partition Bridge routing must be established for sequestered partition 204. In other words, a method for routing requests/results to and from sequestered partition 204 for use of components within sequestered partition 204 by main partition 202 must be established. Once the IPB routing has been established, VoIP offload engine 216 may be loaded into memory and launched. A routing mechanism must also be established for NIC 220 so that sequestered partition 204 may have priority status to receive the attention of NIC 220 when it is not purely dedicated to sequestered partition 204.

Figure 3:
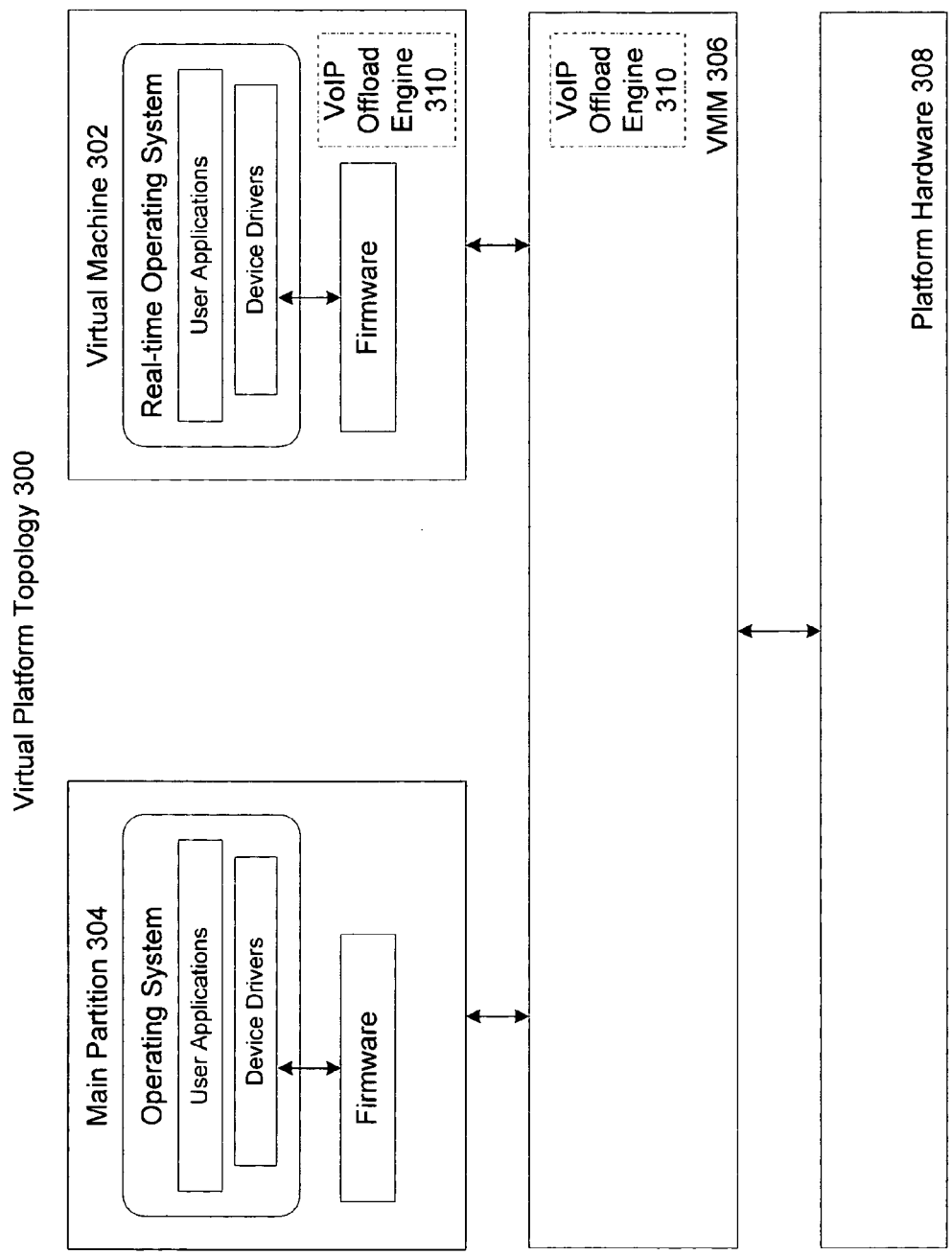
FIG. 3 is a block diagram illustrating an embodiment of the present invention in an exemplary virtualized environment according to an embodiment of the present invention.

Embodiments of the present invention can also be implemented in a virtualized platform topology. FIG. 3 is a block diagram implementation of an embodiment of the present invention in a virtualized environment according to an embodiment of the present invention. Virtualized platform topology 300 comprises a virtual machine 302, main partition 304, and a virtual machine monitor 306 coupled to both virtual machine 302 and main partition 304. Virtual machine monitor 306 is also coupled to platform hardware 308, such as, for example, memory and an AGP via a MCH, and I/O devices, such as NICs, hard drives, flash memory, keyboards, mouses, etc. via an ICH. The MCH is coupled to the ICH, as shown in FIG. 1, and together form a chipset.

Virtual machine 302 may be a virtualized operating environment that may be processed using a processor, such as, but not limited to, an Intel® Xeon processor manufactured by Intel® Corporation located in Santa Clara, Calif. Virtual machine 302 includes a real-time operating system and associated VoIP application software. In an embodiment, one or more virtual machines may be used, with each virtual machine operating on the same host machine. In this instance, VMM 306 may be used to arbitrate for resources.

Platform 300 may also include a VoIP offload engine 310. As previously indicated, VoIP offload engine 310 allows telephony usage over an IP (Internet Protocol) network through the digitization and packetization of voice transmissions. VoIP engine 310 converts analog voice signals to digital signals. The digital signals are then compressed and translated into digital packets for transmission over the Internet to a receiver. The receiver can then decompress and depacketize the data back into an analog signal for listening over a speaker, earpiece, or any other device that enables one to hear analog signals. In one embodiment, VoIP offload engine 310 (shown in phantom) may reside in virtual machine 302.

In another embodiment, VoIP offload engine 310 (shown in phantom) may reside in virtual machine monitor 306. Virtual Machine Monitor (VMM) 306 may be used to access platform resources on platform hardware 308 among multiple OSs that are used by virtual machine 302 and main partition 304. In embodiments where I/O devices, such as, for example, NIC 122 in FIG. 1, are solely dedicated to virtual machine 302 for VoIP functionality, VMM 306 makes sure that main partition 304 is unaware of NIC 122, and therefore, may not be used by main partition 304. In embodiments where main partition 304 may have the ability to use VoIP functionality, VMM 306 acts as an Inter-Partition Bridge (IPB) to provide a communication link between virtual machine 302 and main partition 304. In this instance, VMM 306 may establish a routing mechanism for NIC 122 so that a VoIP agent will have priority over NIC 122 when NIC 122 is not purely dedicated to virtual machine 302.

Figure 4A:
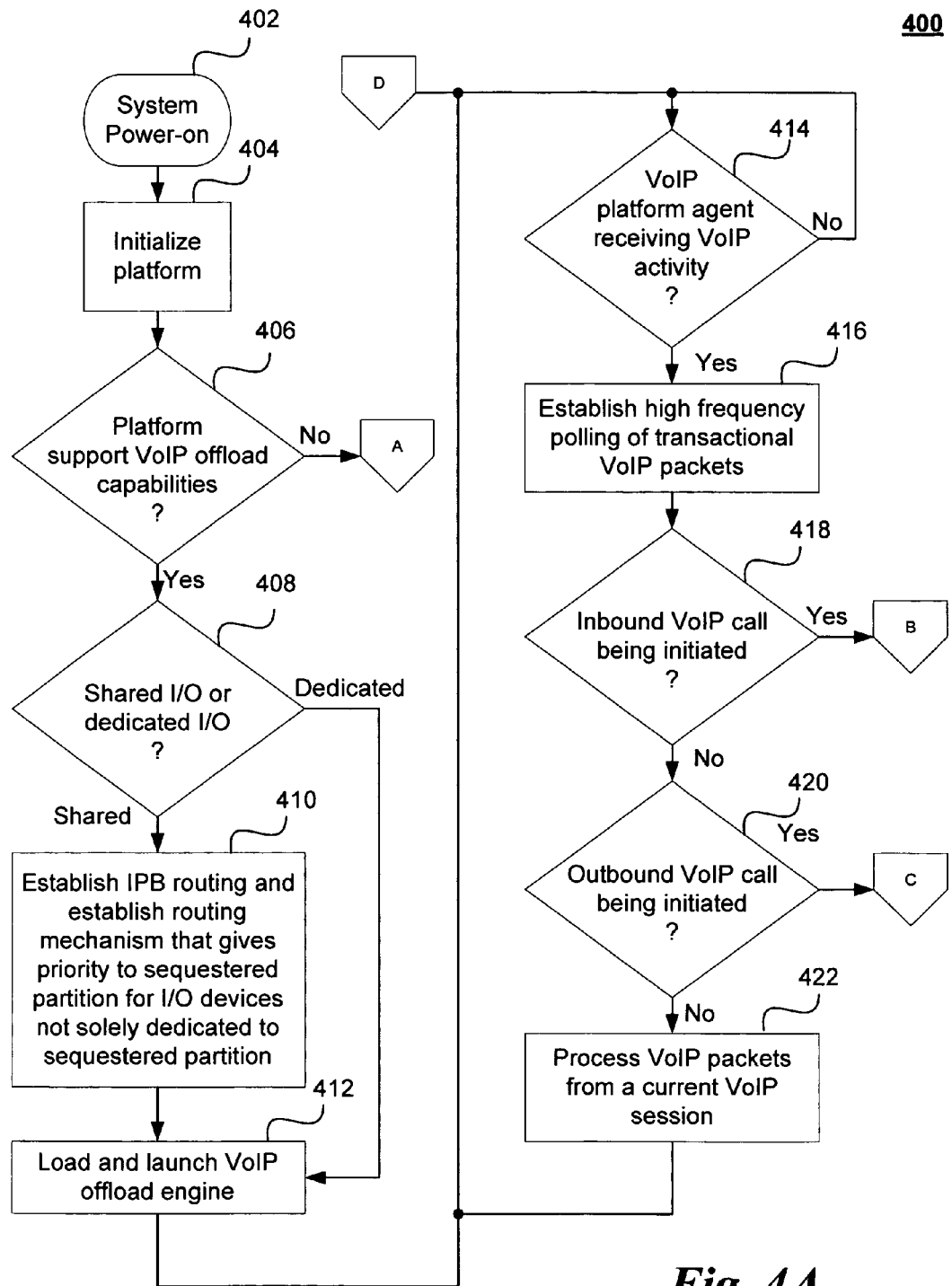
FIGS. 4A and 4B are a flow diagram describing an exemplary method for enabling a VoIP offload in a sequestered partition according to an embodiment of the present invention.
Figure 4B:
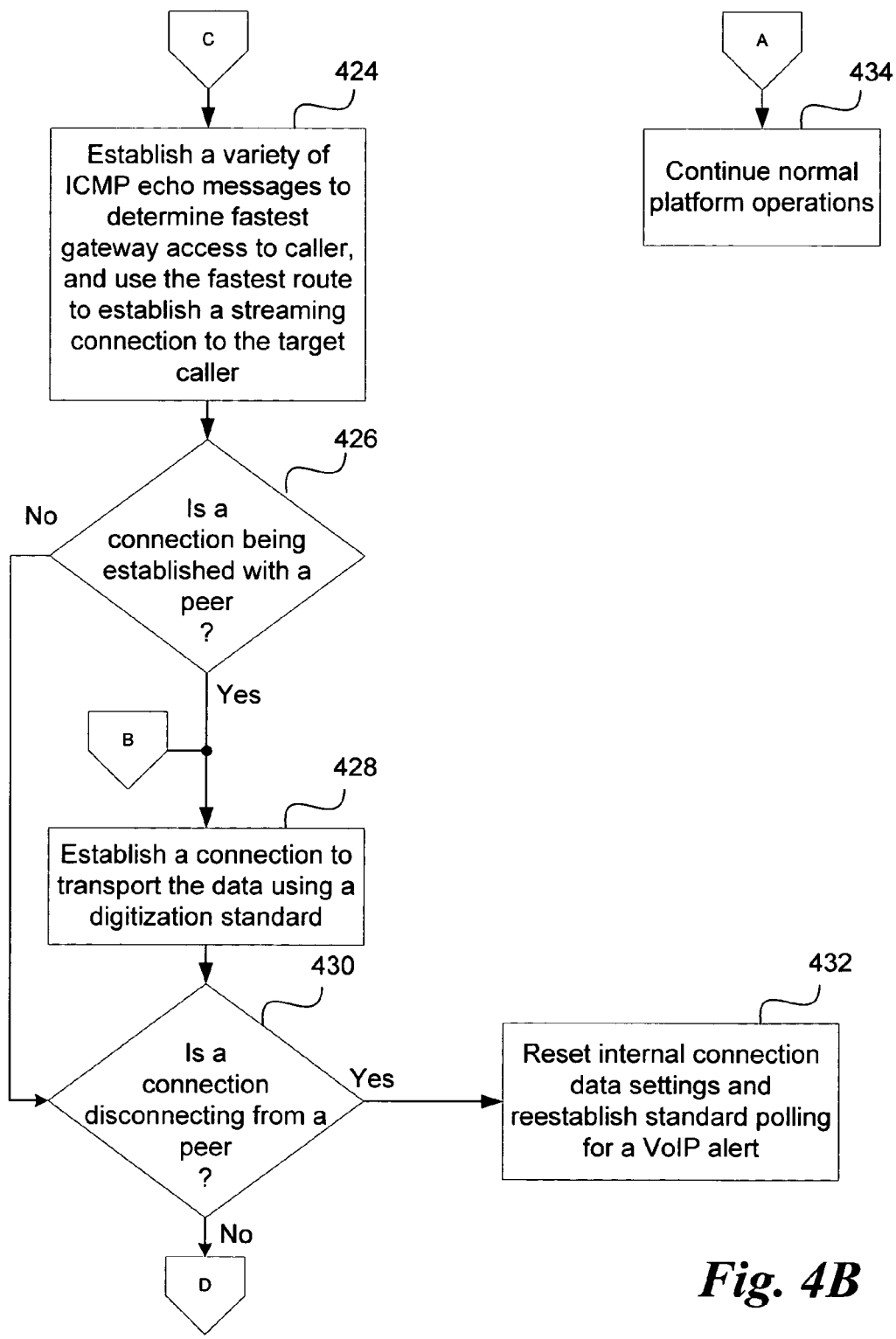

FIGS. 4A and 4B are a flow diagram 400 describing an exemplary method for enabling a VoIP offload engine in a sequestered partition according to an embodiment of the present invention. Flow diagram 400 provides a method that can be utilized in a virtualization environment as well. The invention is not limited to the embodiment described herein with respect to flow diagram 400. Rather, it will be apparent to persons skilled in the relevant art(s) after reading the teachings provided herein that other functional flow diagrams are within the scope of the invention. The process begins with system power-on at block 402 in FIG. 4A, where the process immediately proceeds to block 404.

In block 404, the platform initializes its underlying infrastructure in a manner well known to those skilled in the relevant art(s). The process then proceeds to decision block 406.

In decision block 406, it is determined whether the platform supports VoIP offload capabilities. If the platform does support VoIP offload capabilities, the process proceeds to decision block 408.

In decision block 408, it is determined whether the sequestered partition provides for shared I/O devices or dedicated I/O devices. If it is determined that the sequestered partition provides for shared I/O devices, then the process proceeds to block 410.

In the block 410, IPB routing is established for the sequestered partition to enable communications between the sequestered partition and the main partition. A routing mechanism is also established that gives priority to the sequestered partition for I/O devices that are not solely dedicated to the sequestered partition. The process then proceeds to block 412.

Returning to decision block 408, if it is determined that the sequestered partition provides for dedicated I/O devices, then the process proceeds to block 412.

In block 412, the VoIP offload engine is loaded and launched. The process then proceeds to decision block 414.

In decision block 414, it is determined whether a VoIP platform agent is receiving any VoIP activity. If the VoIP platform agent is not receiving any VoIP activity, then the process remains at decision block 414 until VoIP activity is received. If the VoIP platform agent is receiving VoIP activity, then the process proceeds to block 416.

In block 416, a high frequency polling of transactional VoIP packets is established to permit real-time disbursement of data. Thus, once VoIP activity occurs, higher priority is given to polling for VoIP transactions so that more bandwidth can be given to VoIP transactions versus other lower priority transactions. The process then proceeds to decision block 418.

In decision block 418, it is determined whether an inbound VoIP call is being initiated. If it is determined that an inbound VoIP call is not being initiated, the process proceeds to decision block 420.

In decision block 420, it is determined whether an outbound VoIP call is being initiated. If it is determined that an outbound VoIP call is not being initiated, then the process proceeds to block 422.

In block 422, VoIP packets from a current VoIP session are processed using a connection-based handshake. The process then proceeds back to decision block 414, where it is determined whether the VoIP platform agent is receiving any VoIP activity.

Returning to decision block 420, if it is determined that an outbound call is being initiated, then the process proceeds to block 424 in FIG. 4B. In block 424, a variety of ICMP (Internet Control Message Protocol) Echo messages are established to determine which gateway route has the fastest access to the caller. Once a determination of the fastest route has been established, a streaming connection to the target caller is made using the requisite VoIP protocol. The process then proceeds to decision block 426.

In decision block 426, it is determined whether a connection is being established with a peer. If it is determined that a connection is being established with a peer, the process proceeds to block 428.

Returning to decision block 418 in FIG. 4A, if it is determined that an inbound VoIP call is being initiated, then the process proceeds to block 428 in FIG. 4B.

In block 428, a connection is established to transport the data through using a digitization standard, such as, but not limited to, G.711, G.729, or any other possible digitization standards. In one embodiment, the established connection is via UDP (User Datagram Protocol). G.711 is an international standard for encoding telephone audio on a 64 kbps (kilo-bits per second) channel as used in a PSTN (Public Switched Telephone Network) network or POTS (Plain Old Telephone Service). G.729 is a narrow band voice codec that has been used in some VoIP applications. G.729 samples at 8 kHz (kilo Hertz), and operates on 16 bits per sample. The process then proceeds to decision block 430.

Returning to decision block 426, if it is determined that a connection is not being established with a peer, the process proceeds to decision block 430.

In decision block 430, it is determined whether a connection is disconnecting from a peer. If it is determined that a connection is not disconnecting from a peer, the process proceeds back to decision block 414 in FIG. 4A, where it is determined whether the VoIP platform agent is receiving any VoIP activity.

Returning to decision block 430 in FIG. 4B, if it is determined that a connection is disconnecting from a peer, the process proceeds to block 432. In block 432, internal connection data settings are reset and standard polling for a VoIP alert is re-established.

Returning back to decision block 406 in FIG. 4A, if it is determined that the platform does not support VoIP offload capabilities, the process then proceeds to block 434 in FIG. 4B. In block 434, the platform continues to operate in a well known manner that does not involve VoIP offload capabilities.

Embodiments of the present invention may be implemented using hardware, software, or a combination thereof and may be implemented in one or more computer systems, as shown in FIG. 1, or other processing systems. The techniques described herein may find applicability in any computing, consumer electronics, or processing environment. The techniques may be implemented in programs executing on programmable machines such as mobile or stationary computers, personal digital assistants, set top boxes, cellular telephones and pagers, consumer electronics devices (including DVD (Digital Video Disc) players, personal video recorders, personal video players, satellite receivers, stereo receivers, cable TV receivers), and other electronic devices that may include at least one processor core, a storage medium accessible by the processor core (including volatile and non-volatile memory and/or storage elements), at least one input device, and one or more output devices. Program code is applied to the data entered using the input device to perform the functions described and to generate output information. The output information may be applied to one or more output devices. One of ordinary skill in the art may appreciate that the invention can be practiced with various system configurations, including multiprocessor systems, minicomputers, mainframe computers, independent consumer electronics devices, and the like. The invention can also be practiced in distributed computing environments where tasks or portions thereof may be performed by remote processing devices that are linked through a communications network.

Each program may be implemented in a high level procedural or object oriented programming language to communicate with a processing system. However, programs may be implemented in assembly or machine language, if desired. In any case, the language may be compiled or interpreted.

Program instructions may be used to cause a general-purpose or special-purpose processing system that is programmed with the instructions to perform the operations described herein. Alternatively, the operations may be performed by specific hardware components that contain hardwired logic for performing the operations, or by any combination of programmed computer components and custom hardware components. The methods described herein may be provided as a computer program product that may include a machine accessible medium having stored thereon instructions that may be used to program a processing system or other electronic device to perform the methods. The term "machine accessible medium" used herein shall include any medium that is capable of storing or encoding a sequence of instructions for execution by the machine and that cause the machine to perform any one of the methods described herein. The term "machine accessible medium" shall accordingly include, but not be limited to, solid-state memories, optical and magnetic disks, and a carrier wave that encodes a data signal. Furthermore, it is common in the art to speak of software, in one form or another (e.g., program, procedure, process, application, module, logic, and so on) as taking an action or causing a result. Such expressions are merely a shorthand way of stating the execution of the software by a processing system to cause the processor to perform an action or produce a result.

While various embodiments of the present invention have been described above, it should be understood that they have been presented by way of example only, and not limitation. It will be understood by those skilled in the art that various changes in form and details may be made therein without departing from the spirit and scope of the invention as defined in the appended claims. Thus, the breadth and scope of the present invention should not be limited by any of the above-described exemplary embodiments, but should be defined in accordance with the following claims and their equivalents.

What is claimed is:

1. A computer comprising:
a plurality of core processors;
a memory communicatively coupled to the plurality of core processors, the memory including a plurality of instructions that in response to be executed cause the computer to:
establish a plurality of soft partitions, wherein at least one soft partition comprises a sequestered partition, the sequestered partition including one or more core processors of the plurality of core processors having a controlled, real-time operating system and at least one network interface card (NIC) coupled to the one or more core processors, the NIC being dedicated to the sequestered partition, wherein the one or more core processors are used as an offload engine solely dedicated to Voice over Internet Protocol (VoIP) processing;
establish a main partition having one or more core processors of the plurality of core processors, the main partition used for multiple functions, apart and distinct from the VoIP processing performed by the sequestered partition;
establish an Inter-Partition Bridge (IPB) to enable communications between the main partition and the sequestered partition;
wait until a VoIP platform agent is receiving VoIP activity;
determine whether an inbound VoIP call is being initiated;
if the inbound VoIP call is not being initiated, determine whether an outbound VoIP call is being initiated; and
if the outbound VoIP call is not being initiated, process VoIP packets from a current VoIP session;
if the outbound VoIP call is being initiated, then establish a variety of Internet Control Message Protocol (ICMP) echo messages to determine which gateway route has the fastest access to a target caller and establishing a streaming connection to the target caller using a VoIP protocol;
if a connection has not been established, determine whether a connection is disconnecting from a peer;
if a connection is not disconnecting from a peer and the VoIP platform agent is receiving VoIP activity, then process the current VoIP activity; and
if a connection is disconnecting from a peer, reset internal connection data and re-establishing standard polling for a VoIP alert.

2. The computer of claim 1, wherein the controlled, real-time operating system includes VoIP applications.

3. The computer of claim 1, wherein IPB routing is established to enable use of components within the sequestered partition by the main partition.

4. The computer of claim 1 wherein a routing mechanism is established to enable the sequestered partition to have priority status over the NIC when the NIC is not purely dedicated to the sequestered partition.

5. The computer of claim 1, wherein the sequestered partition comprises a virtual machine coupled to a virtual machine monitor, the virtual machine to be a virtualized operating environment having the controlled, real-time operating system and the VoIP applications, wherein the virtual machine monitor to enable access to platform resources.

6. The computer of claim 5, wherein the virtual machine includes the VoIP engine.

7. The computer of claim 5, wherein the virtual machine monitor includes the VoIP engine.

8. A method for VoIP (voice over Internet Protocol) processing in a soft partitioning environment, comprising:
determining whether a VoIP soft partition provides for shared I/O (Input/Output) devices;
if the VoIP partition provides for shared I/O devices, establishing an Inter-Partition Bridge routing for the VoIP soft partition to enable communications between the VoIP soft partition and at least one other soft partition on the platform;
loading and launching the VoIP offload engine;
waiting until a VoIP platform agent is receiving VoIP activity;
determining whether an inbound VoIP call is being initiated;
if the inbound VoIP call is not being initiated, determining whether an outbound VoIP call is being initiated;
if the outbound VoIP call is not being initiated, processing VoIP packets from a current VoIP session;
if the outbound VoIP call is being initiated, then establishing a variety of Internet Control Message Protocol (ICMP) echo messages to determine which gateway route has the fastest access to a target caller and establishing a streaming connection to the target caller using a VoIP protocol;
if a connection has not been established, determining whether a connection is disconnecting from a peer;
if a connection is not disconnecting from a peer and the VoIP platform agent is receiving VoIP activity, then processing the current VoIP activity; and
if a connection is disconnecting from a peer, resetting internal connection data and re-establishing standard polling for a VoIP alert.

9. The method of claim 8, wherein upon receiving VoIP activity, the method further comprising establishing a high frequency polling of transactional VoIP packets to permit real-time disbursement of data.

10. The method of claim 8, further comprising:
if a connection has been established, transporting the data through using a digitization standard.

11. The method of claim 10, wherein the digitization standard comprises one of G.711 and G.729 digitization standards.

12. The method of claim 8, further comprising:
if the inbound VoIP call is being initiated and a connection has been established, transporting the data through using a digitization standard.

13. The method of claim 12, wherein the digitization standard comprises one of G.711 and G.729 digitization standards.

14. The method of claim 12, further comprising:
determining whether a connection is disconnecting from a peer;
if a connection is not disconnecting from a peer and the VoIP platform agent is receiving VoIP activity, then processing the current VoIP activity; and
if a connection is disconnecting from a peer, resetting internal connection data and re-establishing standard polling for a VoIP alert.

15. An article comprising: a tangible and non-transitory storage medium having a plurality of machine accessible instructions, wherein when the instructions are executed by a processor, the instructions provide for
determining whether a VoIP soft partition provides for shared I/O (Input/Output) devices;
if the VoIP partition provides for shared I/O devices, establishing an Inter-Partition Bridge routing for the VoIP soft partition to enable communications between the VoIP soft partition and at least one other soft partition on the platform;

loading and launching the VoIP offload engine;

waiting until a VoIP platform agent is receiving VoIP activity;

determining whether an inbound VoIP call is being initiated;

if the inbound VoIP call is not being initiated, determining whether an outbound VoIP call is being initiated;

if the outbound VoIP call is not being initiated, processing VoIP packets from a current VoIP session;

if the outbound VoIP call is being initiated, then establishing a variety of Internet Control Message Protocol (ICMP) echo messages to determine which gateway route has the fastest access to a target caller and establishing a streaming connection to the target caller using a VoIP protocol;

if a connection has not been established with a peer, determining whether a connection is disconnecting from a peer;

if a connection is not disconnecting from a peer and the VoIP platform agent is receiving VoIP activity, then process the current VoIP activity; and if a connection is disconnecting from a peer, resetting internal connection data and re-establishing standard polling for a VoIP alert.

16. The article of claim 15, wherein upon receiving VoIP activity, the article further comprising instructions for establishing a high frequency polling of transactional VoIP packets to permit real-time disbursement of data.

17. The article of claim 15, further comprising instructions for: if a connection has been established, transporting the data through using a digitization standard.

18. The article of claim 17, wherein instructions for the digitization standard comprises one of G.711 and G.729 digitization standards.

19. The article of claim 15, further comprising instructions for:
if the inbound VoIP call is being initiated and a connection has been established, transporting the data through using a digitization standard.

20. The article of claim 19, wherein the digitization standard comprises one of G.711 and G.729 digitization standards.

21. The article of claim 19, further comprising instructions for:
determining whether a connection is disconnecting from a peer;
if a connection is not disconnecting from a peer and the VoIP platform agent is receiving VoIP activity, then processing the current VoIP activity; and
if a connection is disconnecting from a peer, resetting internal connection data and re-establishing standard polling for a VoIP alert.

\* \* \* \* \*